United States Patent [19]

Fogel et al.

[11] Patent Number: 5,214,746

[45] Date of Patent: May 25, 1993

[54] METHOD AND APPARATUS FOR TRAINING A NEURAL NETWORK USING EVOLUTIONARY PROGRAMMING

[75] Inventors: David B. Fogel, San Diego; Lawrence J. Fogel, La Jolla, both of Calif.

[73] Assignee: Orincon Corporation, San Diego, Calif.

[21] Appl. No.: 716,687

[22] Filed: Jun. 17, 1991

[51] Int. Cl.$^5$ .............................. G06F 15/18
[52] U.S. Cl. ...................... 395/23; 395/11; 395/21
[58] Field of Search .................... 395/23, 13

[56] References Cited

U.S. PATENT DOCUMENTS

| | | | |
|---|---|---|---|
| 4,912,649 | 3/1990 | Wood | 364/513 |
| 4,912,651 | 3/1990 | Wood et al. | 364/513 |
| 4,912,652 | 3/1990 | Wood | 364/513 |
| 4,912,654 | 3/1990 | Wood | 364/513 |
| 4,912,655 | 3/1990 | Wood | 364/513 |
| 4,918,618 | 4/1990 | Tomlinson, Jr. | 364/513 |
| 4,933,871 | 6/1990 | DeSieno | 364/513 |
| 5,140,530 | 8/1992 | Guha et al. | 395/13 |
| 5,150,450 | 9/1992 | Swenson et al. | 395/23 |

OTHER PUBLICATIONS

Lawrence J. Fogel, et al., "Artificial Intelligence Through Simulated Evolution", John Wiley & Sons, Inc., NY, N.Y., 1966.
David B. Fogel, "An Evolutionary Approach to the Traveling Salesman Problem", Biol. Cybern., 60, pp. 139-144 (1988).
A. N. Kolmogorov, "On the Representation of Continuous Functions of Many Variables by Superposition of Continuous Functions of One Function and Addition", Dokl Akad Navk SSSR, vol. 14, pp. 953-956 (1957).
Richard P. Lippmann, "An Introduction to Computing with Neural Nets", IEEE ASSP Magazine, Apr. 1987, pp. 4-22.
David J. Montana et al., "Training Feedforward Neural Networks Using Genetic Algorithms", Eleventh International Joint Conference on Artificial Intelligence, 1989, pp. 762-767.
D. E. Rumelhart et al., "Parallel Distributed Processing: Explorations in the Microstructure of Cognition", vol. 1, Foundations, MIT Press, Cambridge, Mass., 1986, pp. 322-328, 423-453, 472-487.
Whitley et al., "Optimizing Neural Networks Using Faster, More Accurate Genetic Search", ICGA'89, Jun. 1989, 391-396.
White, H., "Neural Network Learning and Statistics", AI Expert, Dec. 1989, 48-52.
Heistermann, J., "Learning in Neural Nets by Genetic Algorithms", Parallel Processing in Neural Systems and Computers, 1990, 165-168.
Caudill, M., "Evolutionary Neural Networks", AI Expert, Mar. 1991, 28-33.

*Primary Examiner*—Michael R. Fleming
*Assistant Examiner*—Robert W. Downs
*Attorney, Agent, or Firm*—Spencer, Frank & Schneider

[57] ABSTRACT

A method and apparatus for training neural networks using evolutionary programming. A network is adjusted to operate in a weighted configuration defined by a set of weight values and a plurality of training patterns are input to the network to generate evaluations of the training patterns as network outputs. Each evaluation is compared to a desired output to obtain a corresponding error. From all of the errors, an overall error value corresponding to the set of weight values is determined. The above steps are repeated with different weighted configurations to obtain a plurality of overall error values. Then, for each set of weight values, a score is determined by selecting error comparison values from a predetermined variable probability distribution and comparing them to the corresponding overall error value. A predetermined number of the sets of weight values determined to have the best scores are selected and copies are made. The copies are mutated by adding random numbers to their weights and the above steps are repeated with the best sets and the mutated copies defining the weighted configurations. This procedure is repeated until the overall error values diminish to below an acceptable threshold. The random numbers added to the weight values of copies are obtained from a continuous random distribution of numbers having zero mean and variance determined such that it would be expected to converge to zero as the different sets of weight values in successive iterations converge toward sets of weight values yielding the desired neural network performance.

37 Claims, 8 Drawing Sheets

METHOD AND APPARATUS FOR TRAINING A NEURAL NETWORK USING EVOLUTIONARY PROGRAMMING

BACKGROUND OF THE INVENTION

The invention is directed to neural networks, and more particularly to the training of a neural network to recognize a target or a pattern, or to otherwise evaluate data.

Neural networks are parallel processing structures consisting of nonlinear processing elements or nodes interconnected by fixed or variable weights. A node sums n weighted inputs and passes the result through a nonlinear function. A node is characterized by the amount of an internal threshold, and by the type of nonlinearity used. More complex nodes may contain local memory, temporal integrators, or more complex mathematical operators. These topologies can be specified by differential equations that typically consist of memory decay terms, feedforward terms, and/or feedback terms and can be constructed to generate arbitrarily complex decision regions for stimulus-response pairs; hence they are well suited for use as detectors and classifiers.

Classic pattern recognitior algorithms (e.g. detection, classification, target recognition) require assumptions concerning the underlying statistics of the environment. Neural networks, on the other hand, are non-parametric and can effectively address a broad class of problems as is described, for example, ir R. P. Lippman, "An Introduction to Computing with Neural Nets" IEEE ASSP Magazine, pages 4-22, April 1987. Further, neural networks have an intrinsic fault tolerance. Some "neurons" may fail and yet the overall network can still perform well because information is distributed across all of the elements of the networks (see, for example, Rumelhart and McClelland, "Parallel Distributed Processing," Vol. I, MIT Press, Cambridge, Mass., pages 423-443, 472-486 (1986)). This is not possible in strictly Von Neumann architectures.

Neural network paradigms can be divided into two categories: supervised learning and unsupervised learning. In supervised learning, with which we are concerned here, input data is associated with some output criterion in a one-to-one mapping, with this mapping known a priori. The mapping is then learned by the network in a training phase. Future inputs which are similar to those in the training sample will be classified appropriately.

Multiple layer perceptrons, a type cf neural network also known as a feedforward network, are typically used in supervised learning applications. Each computation node sums n weighted inputs, subtracts a threshold value (bias term) and passes the result through a logistic function. An appropriate choice of logistic function provides a basis for global stability of these architectures. Single layer perceptrons (i.e., feedforward networks consisting of a single input layer) define decision regions separated by a hyperplane. If inputs from given different data classes are linearly separable, a hyperplane can be defined between the classes by adjusting the values of the weights and bias terms. If the inputs are not linearly separable, containing overlapping distributions, a least mean square (LMS) solution is typically generated to minimize the mean squared error between the calculated output of the network and the actual desired output.

Two layer perceptrons (i.e., neural networks with a single hidden layer of processing elements) can define unbounded, arbitrary convex polytopes in the hyperspace spanned by the inputs. These regions are generated by the intersections of multiple hyperplanes and have at most as many sides as there are nodes in the hidden layer.

Three layer perceptrons can form arbitrarily complex decision regions. No more than three layers of elements in perceptron networks are necessary to solve arbitrary classification mapping problems (see A. N. Kolmogorov, "On the Representation of Continuous Functions of Many Variables by Superposition of Continuous Functions of One Function and Addition", Dokl Akad Navk SSSR, Vol. 14, pages 953-956, 1957).

Both continuous valued inputs and continuous valued outputs may be implemented, allowing for a wide range of input types and output categories. The inputs received by the respective nodes of the input layer define a vector containing the input feature values to be studied. These may consist of state-space components, frequency components, pixel values, transform coefficients, or any other features considered important and representative cf sample data contents to be learned.

Given a network architecture, a training set of input patterns, and the corresponding target output values (desired output values), every set of weight values and bias values defines the output of the network for each presented pattern. The error between the actual output of the network and the target or desired output value defines a response surface over an N-dimensional hyperspace, where there are N weights and bias terms to be adapted. Training cf a multi-layered network can be achieved through a backpropagation algorithm (see, for example the above mentioned Rumelhart and McClelland text), which implements a gradient search over the error response surface for the set of weight values which minimizes the sum of the squared error between the actual and target output values. A backpropagation algorithm which purports to accelerate the training relative to the traditional techniques is described in U.S. Pat. Nos. 4,912,649, 4,912,652, 4,912,654, and 4,912,655, issued to Wood, and U.S. Pat. No. 4,912,651 issued to Wood et al. Another backpropagation algorithm for use with a particular neural network is described in U.S. Pat. No. 4,918,618 issued to Tomlinson, Jr.

However, the differential equations and their associated stability functions defining the neural network generate energy surfaces that may contain many local optima, so that the error response surface may contain many corresponding local minima that may be far removed from the globally optimum solution. A gradient technique such as a backpropagation algorithm may lead to entrapment in these suboptimal solutions so that the network inaccurately classifies input patterns. For example, in the approach taught by the Tomlinson patent, single changes in a bit structure representing weight values of a neural network are made after each run with test data, and the process looks at one parameter at a time. As a result, the process solutions (sets of weight values) take directions of steepest descent toward locally best solutions with respect to individual parameters and a globally best solution is unlikely to be identified.

One strategy to avoid the problem of local optima is simply to restart the optimization with a new random set of weight values, in the hope that a different optimum will be found. Of course, there is no guarantee that such a minimal energy well will not also be a local solution. Another technique is to perturb the weight values whenever the algorithm seems to be in a local minimum point and then continue training, but this does not guarantee that the same local solution will not be rediscovered (see, for example the above-mentioned Rumelhart and McClelland text). Further, should the response surface be pocked with many local optima, the constant modification of the weight values may make the gradient search technique ineffective at finding even "good" locally optimal solutions. If additional nodes are added to the network until the training algorithm discovers a suitable solution, the resulting network may be severely overdefined. Any training data can be correctly classified if the network is given sufficient degrees of freedom. However, such a network is unlikely to perform well on new data taken independently from the training data.

Simulated annealing has been used with some success at overcoming local optima is but the required execution time, high because, among other reasons only one proposed solution can be considered at a time making this an unsatisfactory approach to many problems. Better solutions are always kept and worse solutions are retained with a probability which is an exponential function of the degradation D and a "temperature" T which starts at a high level and becomes progressively lower, and may be expressed as exp(-D/T). A difficulty with this approach is that there is no reliable way to select a starting point of the "temperature" and its rate of decline. See, for example, the above-mentioned Rumelhart and McClelland text. Teaching an annealing approach to training a neural network, which favors changes in solutions that are in the direction of the most recent improvement, is U.S. Pat. No. 4,933,871 to DeSieno. This annealing approach is also characterized by considering solutions (sets of weight values) one at a time and further characterized by always retaining the "best" solution as a starting point for change until a "better" solution is discovered. As a result, while permitting locally optimal solutions to be overcome, the process is slow to investigate a wide ranging variety of solutions and can easily be delayed in such local solutions.

A "genetic" algorithm for training a neural network, which is intended to provide a near global optimum solution, has been described in Montana and Davis, "Training Feedforward Neural Networks Using Genetic Algorithms", Eleventh International Joint Conference on Artificial Intelligence (1989). The algorithm creates new solutions (sets of weight values), normally coded as a string of bits or real numbers, by combining two parents, i.e. selecting bits from one or the other to produce progeny. The relative number of uses of particular parents to produce progeny is an exponential function of their relative accuracy or fitness in classifying training patterns. Thus, there is a rapid convergence on locally optimal solutions. However, since between two solutions, the better one is always preferred and thus poorer solutions are generally not retained, i.e. there is no probabilistic search for solutions, convergence on a locally optimal solution is possible, but a global convergence cannot be guaranteed without an additional probability of randomly flipping each individual bit. Also since the solutions are typically coded with strings of bits, the strings typically contain thousands of bits. Combinations of parents are typically performed by selecting a single cross-over point. This creates large jumps over the response surface, thereby making it difficult to fine tune the solutions.

The search for an appropriate set of weights and bias terms for a neural network is a complex, combinational optimization problem. No single parameter can be optimized without regard to all other parameters. Evolutionary programming has been used to address other difficult combinatorial optimization problems such as the traveling salesman problem. See, for example, D. B. Fogel, "An Evolutionary Approach to the Traveling Salesman Problem", Biol. Cybern., 60, pgs. 139-144 (1988). Evolutionary programming approaches to solving of a problem may be described as (1) taking a collection of solutions having some coding with a measurable worth, (2) perturbing the coding to obtain progeny in such a manner that the mean worth of the progeny is the same as that of the parent, e.g. perturbing the parent by adding values selected from a Gaussian distribution with a mean of zero, (3) comparing solutions and (4) probabilistically selecting which solutions are to be retained. The original evolutionary programming concept (see Fogel et al, Artificial Intelligence Through Simulated Evolution, John Wiley & Sons, 1966) focused on the problem of predicting any stationary or nonstationary time series with respect to an arbitrary payoff function, modeling an unknown transducer on the basis of input-output data, and optimally controlling an unknown system with respect to an arbitrary payoff function.

Natural evolution optimizes behavior through iterative mutation and selection within a class of coding structures. The evolutionary process is simulated in the following manner: an original population of "machines" (math logic functions arbitrarily chosen or given as "hints") are measured as to their individual ability to predict each next event in their "experience" with respect to whatever payoff function has been prescribed (e.g. squared error, absolute error, all-none, or another reasonable choice). Progeny are then created through random mutation of the parent machines. The progeny are scored on their predictive ability in a similar manner to their parents. Those "machines" which are most suitable for achieving the task at hand are probabilistically selected to become the new parents. An actual prediction is made when the predictive fit score demonstrates that a sufficient level of credibility has been achieved. The surviving machines generate a prediction, indicate the logic of this prediction, and become the progenitors for the next sequence of progeny, this in preparation for the next prediction. Thus, aspects of randomness are selectively incorporated into the surviving logics. The sequence of predictor machines demonstrates phyletic learning.

SUMMARY OF THE INVENTION

Evolutionary programming can address the problems of local convergence, the appropriate network architecture (including the number of layers, nodes, and feedforward and feedback interconnections), the suitable processing capabilities for an individual "neuron," as well as the inherent problem of adjustment of the learning rate.

It is therefore an object of the invention to provide a method and an apparatus for training a neural network using evolutionary programming to obtain faster, more efficient yet robust training procedures. It is a further object of the invention to provide a method and apparatus for training a neural network which overcomes the problems of the prior art so that global solutions to pattern recognition problems are obtained. It is another object of the invention to provide a method and apparatus for training a neural network which can identify the globally optimum set of weight values (the values of the weights and bias or threshold terms of the network) with a relatively small number of iterations and in a relatively short period of time. It is still another object of the invention to provide a method and apparatus for training a neural network which facilitates substantial use of parallel processing. A further object of the invention is to apply evolutionary programming to the training of neural networks in such a manner that arbitrary interconnections and neurons possessing additional processing capabilities can be accommodated.

The present invention addresses the problems in the training of a neural network of local convergence, the appropriate network architecture (including the number of layers, nodes, and feedforward and feedback interconnections), the suitable processing capabilities for an individual "neuron," as well as the inherent problem of adjustment of the learning rate, using evolutionary programming. When applying evolutionary programming to the training of neural networks, the corresponding adaptive topography is inverted, with evolution proceeding toward valleys as error is minimized. Rather than perform mutation and selection on finite state machines as described, for example in Fogel et al, "Artificial Intelligence through Simulated Evolution," John Wiley & Sons, New York, 1966, the actual interconnection and threshold weights of a network can be varied directly. A population of vectors whose components are the values of the interconnection and threshold weights of the network is maintained at each generation. Each vector has a corresponding error value. Those vectors with the smallest error are probabilistically selected to become parents of the next generation. Mutation is accomplished by adding a continuous random variable with zero mean and finite variance to each component of a parent vector. The random variable should guarantee that substantially every combination of weight values (including interconnection and threshold weight values) can be generated, and should have a variance that tends toward zero as the weight values approach the global optimum. For example, the variance may be determined as a function of results of previous iterations, which would be the case if made proportional to the error of the parent to simulate the effect of genetic buffering that occurs in natural evolution. As this selective random walk iterates, appropriate sets of weight values are evolved.

Evolutionary programming offers the opportunity to perform a parallel search which can overcome local optima. Each contending solution in a parallel operation is probabilistically selected to become a parent in the next generation. Simulated evolution can therefore discover globally optimal sets of weight values. Whereas backpropagation can lead to overdetermined networks, evolutionary programming can effectively train smaller networks which may be more robust.

It is important to note that payoff functions other than the typical mean squared error can easily be incorporated into the evolutionary algorithm. In practice, equally correct classifications are rarely of equal worth. Similarly, errors are not equally costly. Thus, mean square error may not be the best pay-off function in a particular case. Simulating natural evolution provides a paradigm for discovering an optimal set of interconnection weight values and threshold weight values which determine the appropriate network behavior in the context of a given criterion.

A method of training a neural network to evaluate data according to one aspect of the invention includes the following steps: A neural network capable of receiving data and operative in a plurality of different weighted configurations is provided with each configuration being defined by a different set of weight values. Here the weight values would include the values of the interconnection weight and the threshold weights. The network is initially adjusted to operate in a weighted configuration defined by a set of weight values and a plurality of training patterns are input to the network to generate respective evaluations of the training patterns as outputs of the network. Each evaluation of a respective training pattern is compared to a desired output of the network to obtain a corresponding error. From all of the errors, an overall error value, for example the mean square error or the sum of the errors corresponding to the set of weight values, is determined.

The above steps are performed a plurality of times, each time with a different weighted configuration defined by a respective different set of weight values, to obtain a plurality of overall error values. Then, for each of the sets of weight values, a score is determined by selecting respective error comparison values from a predetermined variable probability distribution and comparing them to the corresponding overall error value. The error comparison values could be, for example, a randomly selected subquantity of the just-obtained overall error values, or be selected at random from a uniform distribution of numbers over the range in which the overall error value can fall. A predetermined number, for example half, of the sets of weight values determined to have the "best" scores are selected and copies are made of the selected sets. The weight values of the copies are mutated by adding random numbers to them to create new sets of weight values. The above steps are then repeated, this time with the best sets and the mutated copies defining the weighted configurations of the neural network. In this regard, it is not necessary, although permissible, in the repetitions of the process, to reevaluate the sets of weight values which are retained from the previous evaluation of those sets since the result will be the same. However, scoring of those sets should be performed in the next step on all sets of weight values, including those which were retained from the prior iteration. This procedure is repeated until the overall error values are diminished to below an acceptable threshold. The random numbers which are added to the weight values of the copies of the best sets during their mutation are obtained randomly from a continuous random distribution of numbers (such as a Gaussian distribution) having a zero mean and a variance determined in such a manner that it would be expected to converge to zero as the different sets of weight values utilized in successive iterations converge toward a single set of weight values (solution) and, correspondingly, as the overall error values converge to zero. A variance which is a function of the overall error value determined for the set of weight values from which the copy was generated would meet the above criteria. A variance resulting from a stochastic search, independent of the solutions previously derived, which is designed to derive variances that converge to zero as the solutions converge to the global best, would also meet the above criteria.

This method has an advantage of not getting stuck in local minima, while progressively moving toward a global solution. Moreover, many of the steps which would be most time consuming, if performed serially, lend themselves to straightforward applications of parallel processing due to the independence of many of the steps with respect to the different sets of weight values and with respect to the different weight values within each set. Thus, for example, separate neural networks and comparators may be provided for each unique combination of a training pattern and a set of weight values, so that all evaluations needed for a selection of sets of weight values that are to serve as the basis for the next iteration of the method, can be obtained at once. Similarly, preliminary to a selection of sets of weight values, determinations of all overall error values, and then scoring of sets of weight values based or the overall error values, can be performed in parallel. Moreover, after a selection of sets of weight values, mutations of the weight values of copies of the selected sets can be performed in parallel.

BRIEF DESCRIPTION OF THE DRAWINGS

These and other features and advantages of the invention will be further understood from the following detailed description of the preferred embodiments with reference to the accompanying drawings in which.

DESCRIPTION OF THE PREFERRED EMBODIMENT

Figure 1:
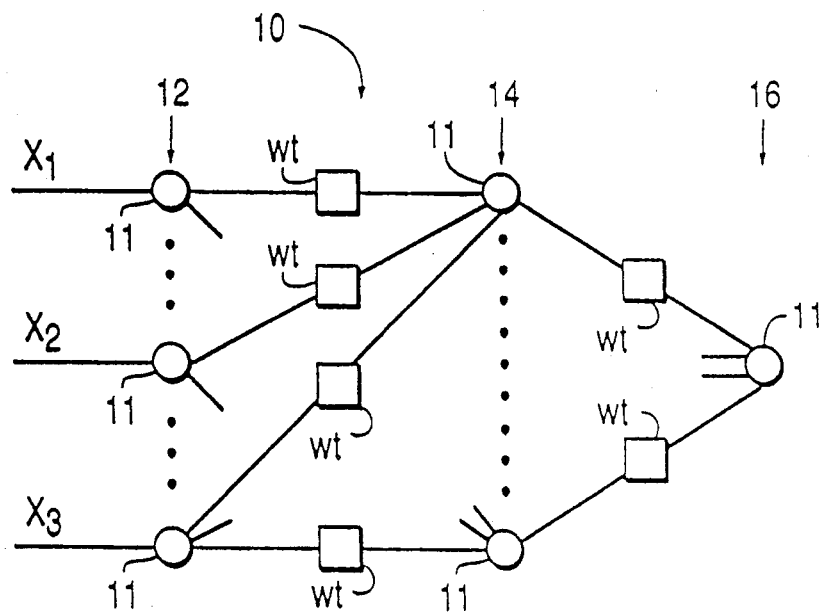
FIG. 1 is a schematic illustration of an arrangement of nodes of a neural network.

FIG. 1 illustrates an arrangement of nodes, and interconnections thereof, in a neural network 10 which can be trained according to the invention to perform pattern recognition such as detection, pattern classification and target recognition. The neural network 10 has a number of successive layers of nodes 11 including an input layer 12, one or more hidden layers 14 and an output layer 16. Every node of the input layer and the hidden layers is connected to every node of the next successive layer through a respective weighted connection or connection weight or simply weight wt. The weights wt multiply the outputs of the nodes of the input and hidden layers by respective weight values wt which can be changed individually at will.

Figure 2:
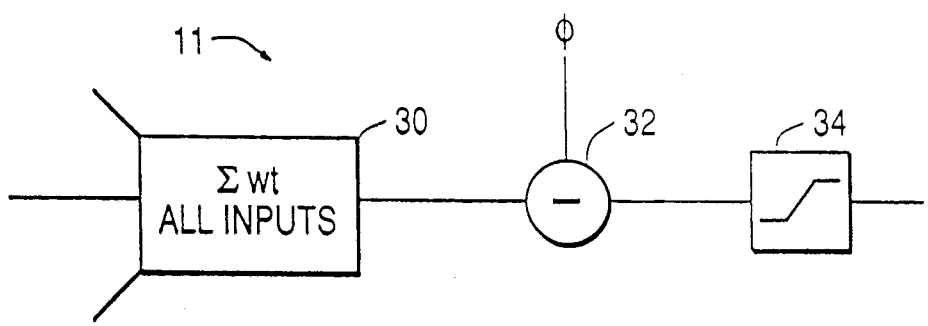
FIG. 2 schematic function illustration of a node of a feedforward neural network.

Referring to FIG. 2, the nodes 11 in the different layers of a conventional feedforward neural network, also known as a perceptron, sum all of the weighted inputs thereto at 30 (only one input in the case of the nodes of the input layer). Each node subtracts a threshold value $\phi$ at 32, and performs nonlinear processing on the result at 34 to provide an output. The output, except for the nodes or node of the output layer, is input to all of the nodes of the next layer after being multiplied by the weight value wt corresponding to the node to which it is being directed. Other types of neural networks, also contemplated for training according to the method of the invention may provide as inputs to respective nodes feedback from nodes of subsequent layers and inputs from nodes two or more layers behind. The threshold value $\phi$ can also be changed at will and may be thought of as just another weight value, but always multiplies an input having a predetermined value of $-1$. In the remainder of this specification reference to a "threshold weight" is to that part of the node which subtracts threshold values. Also, threshold values will not be distinguished from interconnection weight values and the term weight values will be used to describe either or both.

According to the method, a neural network is trained on a number of different training "patterns". Here the term "pattern" should be interpreted broadly to indicate a set of data to be recognized, identified or otherwise interpreted. The training patterns are run using a number of weight configurations defined by different sets of weight values and, after all of the training patterns have been run on all of the weight configurations, at least some of the weight values are modified and the training procedure is repeated. This is done repeatedly until the different sets of weight values converge on an optimum set of weight values. The training patterns could be, for example, groups of pixels representing images of human faces and the intent would be to train the network to recognize a particular person, independently of facial expression and other variables. The method is also applicable to training a neural network wherein the training patterns are changing in time, as where the network is used in process control applications.

Figure 3:
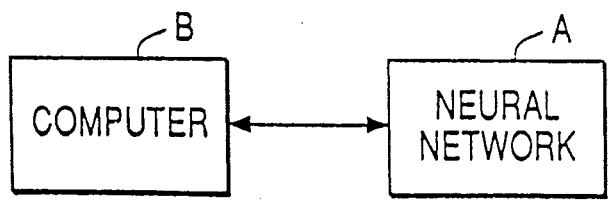
FIG. 3 is a block diagram of a circuit arrangement for training a neural network according to the invention.
Figure 4A:
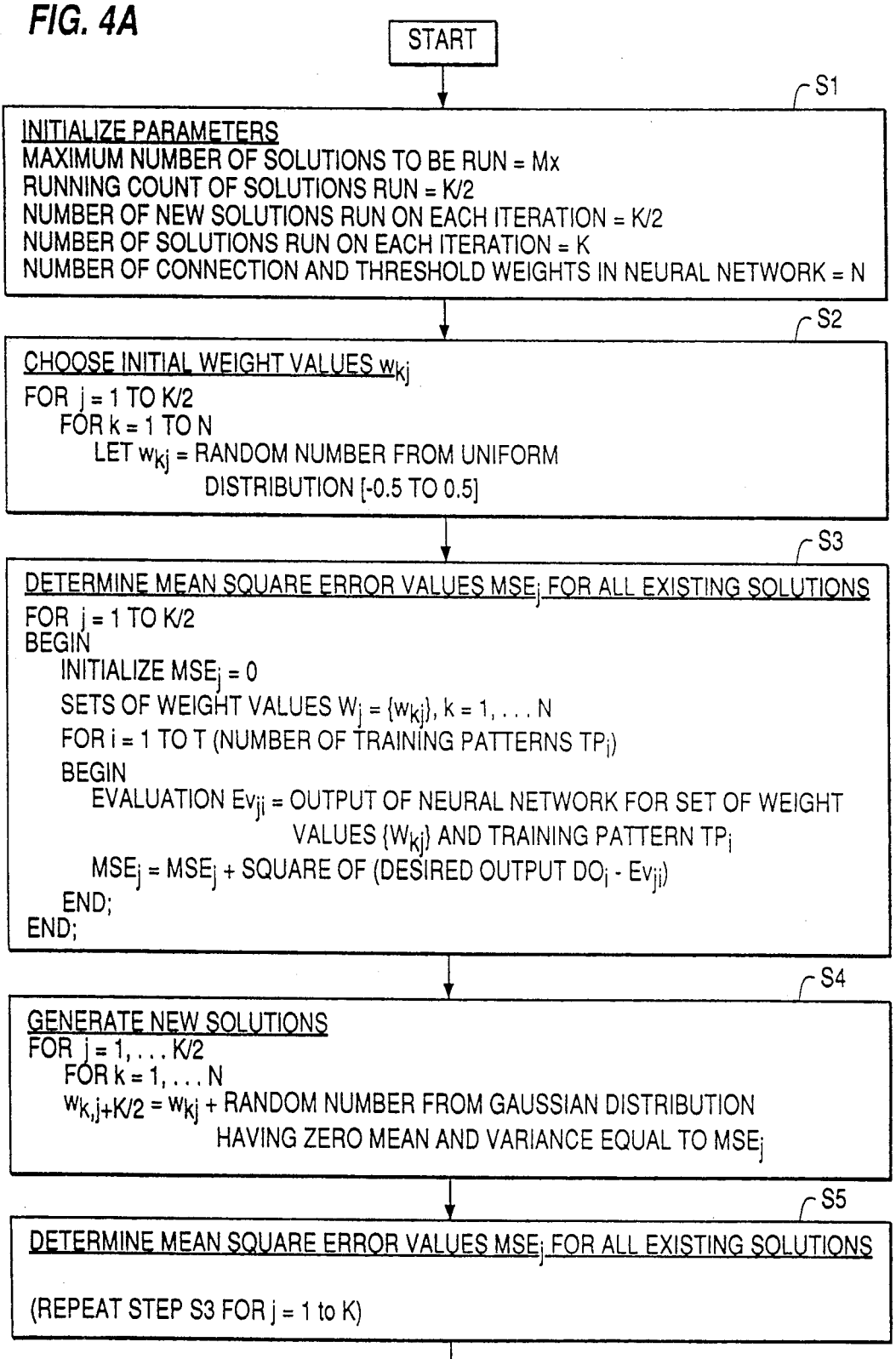
FIGS. 4A and 4B form a flow chart of a process for training a neural network according to an embodiment of the invention.
Figure 4B:
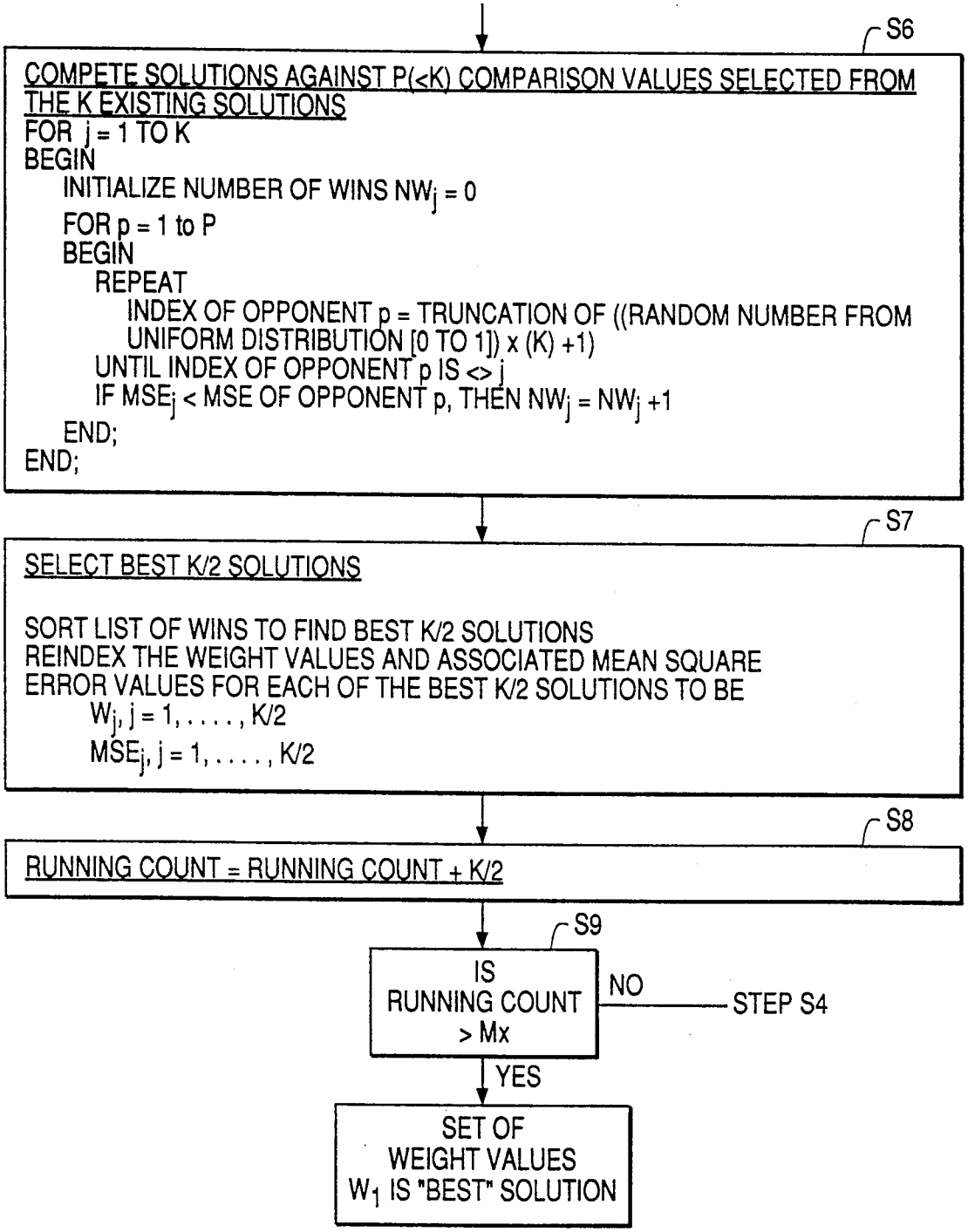

FIG. 3 is a block diagram of an arrangement for training a neural network A wherein all steps are performed serially using a conventional computer B, such as an Apple Macintosh IIci, which is connected to the network A. A flow chart of a process of training the neural network A with the computer B, is shown in FIGS. 4A and 4B. In Step S1, an initialization of parameters is performed. The parameters include (1) the maximum number Mx of different sets of weight values (solutions) with which the process is to be iterated; (2) the running count of different solutions generated—(initially set equal to the number of new solutions run on each iteration (see (4) below); (3) the number K of sets of weight values to be used during each iteration (an even number in the illustrated embodiment); (4) the number of sets of weight values to be retained and to serve as parents for new sets to replace discarded sets (K/2 in the illustrated embodiment); and (5) the number N of weights (including interconnection weights and threshold weights) in the neural network.

In Step S2, initial values $w_{kj}$ of the weights wt of K/2 sets are determined. The initial values may be simple guesses, already determined weight sets, or, as illustrated, may be selected randomly from some probability distribution such as the uniform distribution from $-0.5$ to $+0.5$.

In step S3, these sets of weight values are evaluated in the neural network A on several (T) training patterns and the evaluations are compared in the computer B with desired outputs of the neural network. First, the weights of the neural network are set equal to the weight values, one set of weight values at a time. For each set $W_j$, $j=1, \ldots, K/2$, of weight values $w_{kj}$, $k=1, \ldots, N$, the T training patterns $TP_i$, $i=1, \ldots, T$ are applied to the input nodes of the neural network, one pattern at a time, and an evaluation $Ev_{ji}$ is output from the output node of nodes for each training pattern. The evaluations $Ev_{ji}$ may be scalar values or vectors depending on whether the network has a single output node, or a plurality of output nodes, which in turn would depend on whether the identity of the training patterns being evaluated is defined by one, or more than one, characteristic. In the illustrated case, only one characteristic and thus one output node and a scalar value $Ev_{ji}$ for each trial is assumed for the sake of simplicity. The evaluations $Ev_{ji}$ are compared with desired output values $DO_i$ to obtain error values $E_{ji} = Ev_{ji} - DO_i$. Thus, if we let the numerical value "1" represent perfect identification of a training pattern by a neural network as having a particular identity, and let "0" represent perfect identification of the training pattern by the neural network as not having the particular identity, the outputs of the neural network are compared to either "1" or "0" depending on whether the training pattern does or does not correspond to the particular identity. Then the comparison results $E_{ji}$ produced by the neural network for each of the training patterns $TP_i$, $i=1, \ldots, T$ are used in an error analysis to obtain respective overall error values $MSE_j$ as measures of how well overall the neural network with weight value sets $W_j$ performed in distinguishing the training patterns having the particular identity from those which do not. In the illustrated embodiment, the overall error values are mean square error values obtained by adding squares of the differences $Ev_{ji} - DO_i$ and dividing the sum by the number of training patterns T. If the outputs of the neural network are vectors (and therefore the desired output values are also vectors), then the overall error values could be determined by taking the distance between the desired output vectors and the output (evaluation) vectors.

Next, in step S4, new solutions (new sets of weight values) $W_{j+K/2}$, $j=1, \ldots, K/2$, are generated from those just evaluated in step S3 (serving as "parents"). The new solutions are generated by mutating the individual weight values of the copies, that is, by adding random numbers selected from a continuous distribution having a zero mean and a variance which is a function of the just determined overall error value $MSE_j$ for the weight value set $W_j$. Such a continuous distribution, for example may be a Gaussian (random normal) distribution of zero mean and variance equal to the overall error value $MSE_j$. The reason for selecting the variance as a function of the overall error value will be explained below. The new solutions generated in this way, which are progeny of the parents generated in step S2, undergo in step S5 the same error analysis performed on the solutions earlier evaluated in step S3. Alternatively, although in part redundant, all existing solutions may be subjected to the error analysis in step S5.

At this stage there have now been determined a full population of sets (K sets) of weight values and associated overall error values. In step S6, a score is determined for each of the sets of weight values. The score is determined by selecting several, for example 10 percent of K, error comparison values from a predetermined variable probability distribution and comparing them to (competing them with) the corresponding overall error value. The error comparison values could, for example, be a randomly selected predetermined number of the just-obtained overall error values (steps S3 and S5).

Each comparison value could be selected, as indicated in FIGS. 4A and 4B, by randomly selecting indices of the overall error values to be used in this manner. First a number is selected from the uniform distribution from zero to one. That number is then multiplied by K, one is added, and the sum truncated at the decimal point. Each time that the overall error value is less than the comparison error value, a "win" is recorded. If the comparison index of the error value is equal to the index of the solution being scored, the result is ignored (so that an overall error value is not compared to itself), and in its place another comparison error value is selected and compared to the overall error value.

Upon completion of step S6 (when the overall error values for all of the sets of weight values have competed against a corresponding group of probabilistically selected comparison values), the sets of weight values are, in step S7, sorted in an order of decreasing numbers of wins. The first half of the sorted sets of weight values $W_j$, thus the "best" sets of weights, and their associated overall error values $MSE_j$ are reindexed from 1 to $K/2$. By "best" sets of weights is, of course, meant the sets of weights with the highest scores. Naturally, if losses rather than wins were being counted to obtain the scores, the best scores would be the lowest scores.

In step S8, the parameter "Running Count" is now increased by $K/2$ to K since the running count of different solutions generated is now equal to K. This value of Running Count will normally at this stage be much less than the maximum count Mx, as determined in step S9, and the process will return to step S4.

The reindexed best sets of weight values $W_j$, $j=1, \ldots, K/2$, now serve as parents for a new set of weight values (progeny), to be generated by repeating step S4, that is, by adding random numbers to the weight values $w_{kj}$ of the reindexed sets of weight values according to the procedure defined in step S4. Steps S5, S6, S7, S8 and S9 are then repeated based on the result of step S4, and steps S4–S9 are repeated again and again until in step S9, the parameter Running Count equals or exceeds Mx, at which point, if the parameter Mx is high enough, the sets of weight values will have converged to a globally optimum solution which will be output by computer B in step S10.

It will be noted that the procedure of competitions (step S6), by which a determination of which solutions will survive to be used again and serve as parents for the next generation of solutions, is probabilistically most likely to assign the highest numbers of wins to the sets of weight values with the lowest overall error values. However, the statistical possibility always exists that sets of weight values having relatively high overall error values will win a high number of competitions. This permits the full range of possible solutions to be investigated and thus reduces the likelihood of the solutions getting delayed at local optima which may be far from the globally best solution.

Figure 5A:
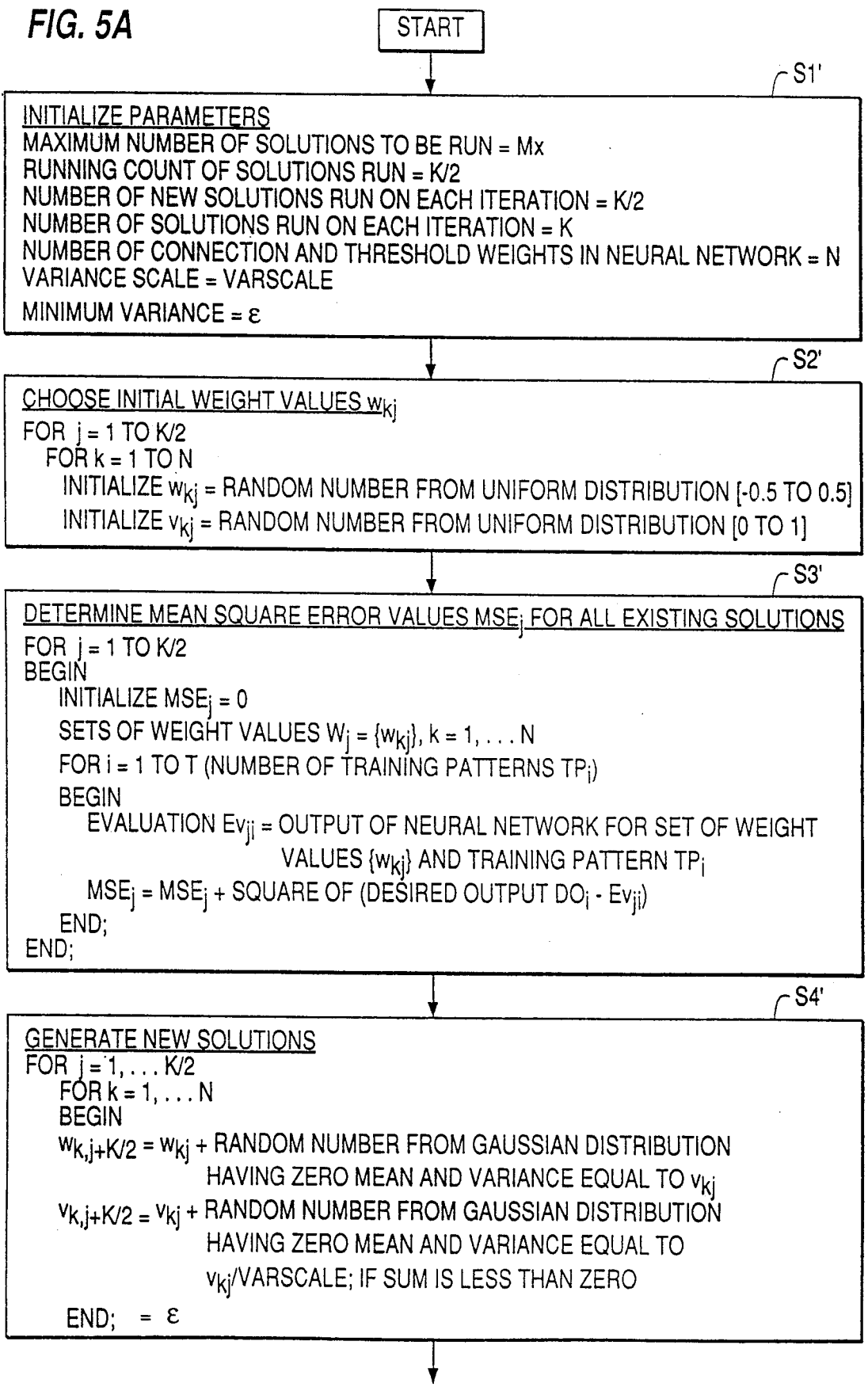
FIGS. 5A and 5B form a flow chart of a process for training a neural network according to another embodiment of the invention.
Figure 5B:
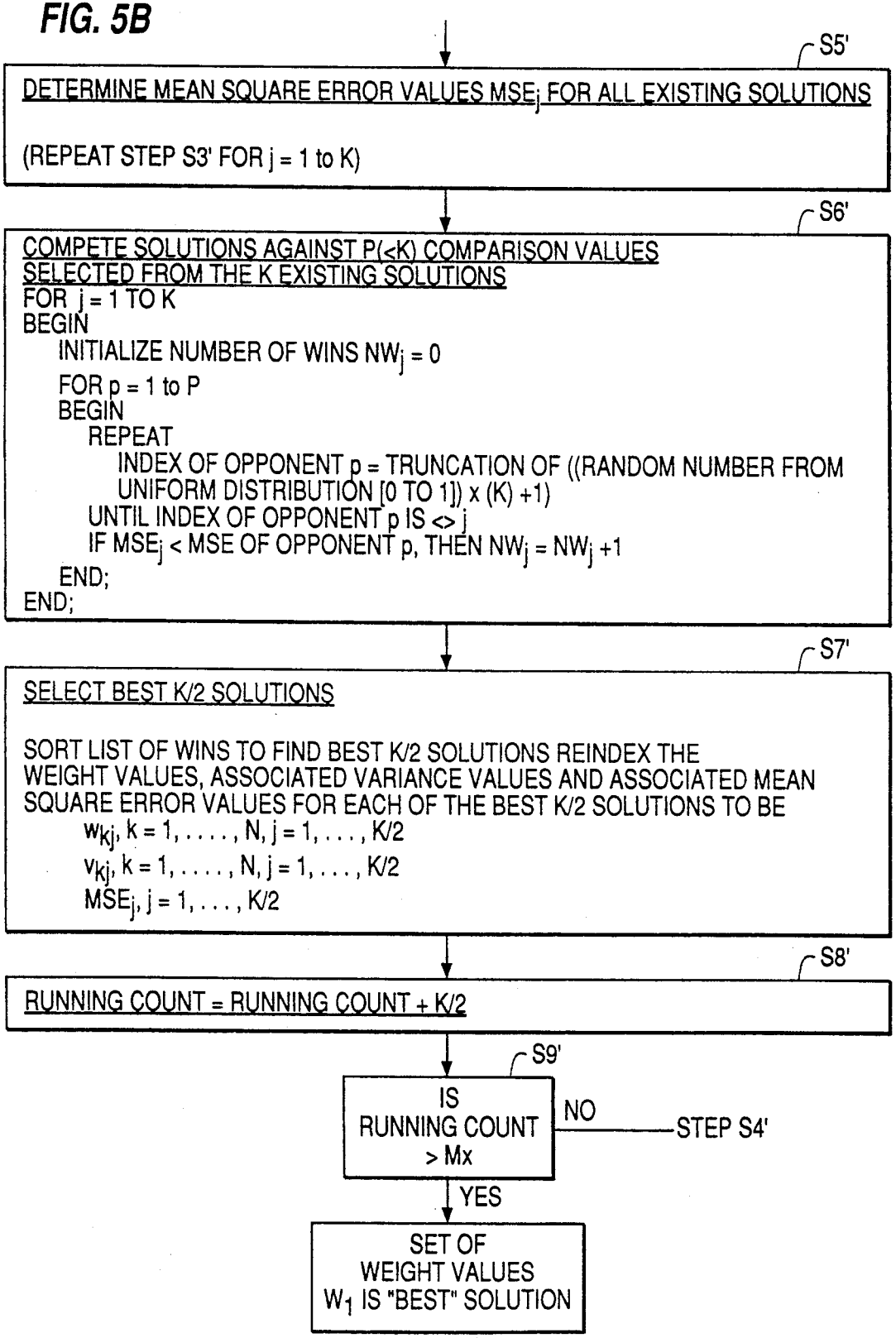

The random numbers which are added to the weight values of the copies of the best sets during their mutation in step S4 are obtained randomly from a continuous random distribution of numbers (such as a Gaussian distribution) having a mean of zero and a finite variance. In order that the variance be determined in such a manner as to encourage the solutions (the different sets of weights used) to converge rapidly to the globally optimum solution, the variances themselves should advantageously converge toward zero as the solutions converge to the globally best. A variance which is proportional to the overall error values $MSE_j$ determined for the set of weight values from which the copy was generated well meets this criteria and has therefore been adopted in the above-described embodiment of the invention. Other stochastic procedures for selecting the variance, which are independent of the weight values previously derived, and thus also independent of the errors which the neural network produced when the sets of weight values ::ere used, may also be effective. For example, selecting the variance as a function of the numbers which were added to the weight values of a parent of the set of weight values from which the copy was generated meets the criteria. Another preferred embodiment of the invention, incorporating another procedure for selecting the variance which meets this criteria, is illustrated in FIGS. 5A and 5B.

For the sake of brevity, only the differences between the process of illustrated in FIGS. 5A and 5B and the process of FIGS. 4A and 4B will be described in detail. In step S1' the values of additional parameters, a variance scale "VarScale," and a minimum variance "$\epsilon$" are set. The significance of these parameters will be discussed below.

In step S2', for each initial weight value $w_{kj}$ selected, a corresponding initial variance or variance value $v_{kj}$ is selected from the uniform distribution zero to one. The next step, step S3', is the same as step S3 of the above described process of FIGS. 4A and 4B.

In step S4', new weight values $w_{k,j+K/2}$ are generated by adding to a copy of the weight value $w_{kj}$ generated in step S2' a number selected from a continuous random distribution of zero mean and a variance which is a function of, e.g. equal to, the corresponding initial variance $v_{kj}$. Also, a new variance $v_{k,j+K/2}$, to correspond to the new weight value $w_{k,j+K/2}$, is generated by mutating a copy of the variance $v_{kj}$ determined in step S2', in particular, by adding thereto a number selected from a continuous random distribution of zero mean and a variance which is a function of the variance $v_{kj}$. In the illustrated embodiment, the random distribution is a Gaussian distribution having a variance which is equal to the variance $v_{kj}$ divided by the variance scale VarScale. The parameter VarScale is a number which assures that in most cases the new variance $v_{k,j+K/2}$ will differ from the variance $v_{kj}$ by a number which is small compared to $v_{kj}$ and will only rarely be of equal or greater magnitude than $v_{kj}$. For example, the number could be 1/36 so that the random number added to the prior variance $v_{kj}$ to obtain the new variance would have to lie outside of six standard deviations from the mean in order to exceed in magnitude the prior variance $v_{kj}$. In order that the variance will always be positive (and thus the random numbers selected from the distribution will be real), if the random number selected to add to the parent variance $v_{kj}$ is negative and has a magnitude greater that the parent variance $v_{kj}$, the new variance $v_{k,j+K/2}$ is set equal to the predetermined minimum variance $\epsilon$.

Steps S5' and S6' are performed identically to steps S5 and S6 of the previously described process of FIGS. 4A and 4B. Upon completion of step S6', (when the overall error values for all of the sets of weight values have competed against a corresponding group of probabilistically selected comparison values), the sets of weight values are, in step S7', sorted in an order of decreasing numbers of wins. The weight values $w_{kj}$ of the first half of the sorted sets of weight values, and their associated overall error values $MSE_j$ and variances $v_{kj}$, are reindexed from 1 to K/2. Steps S8', S9' and S10' are performed identically to steps S8, S9 and S10 of the previously described process of FIGS. 4A and 4B.

It will be apparent to those skilled in the art that with a suitably hardwired circuit arrangement, the processes described above may be performed with parallel processing so as to substantially speed up the training of a neural network. That is, all of the initial weight values and/or variance values may be selected and set in the neural network in parallel in step S2 or S2', all of the overall error values $MSE_j$ may be determined in parallel in step S3 or S3', all of the new weight values and/or new variance values may be generated in parallel in step S4 or S4', all of the new weight values and/or new variance values may be selected and/or set in the neural network in parallel in step S5 or S5', and all of the competitions of all of the solutions may be performed in parallel in step S6 or S6'. Such a circuit arrangement is illustrated in block form in FIG. 6.

Figure 6:
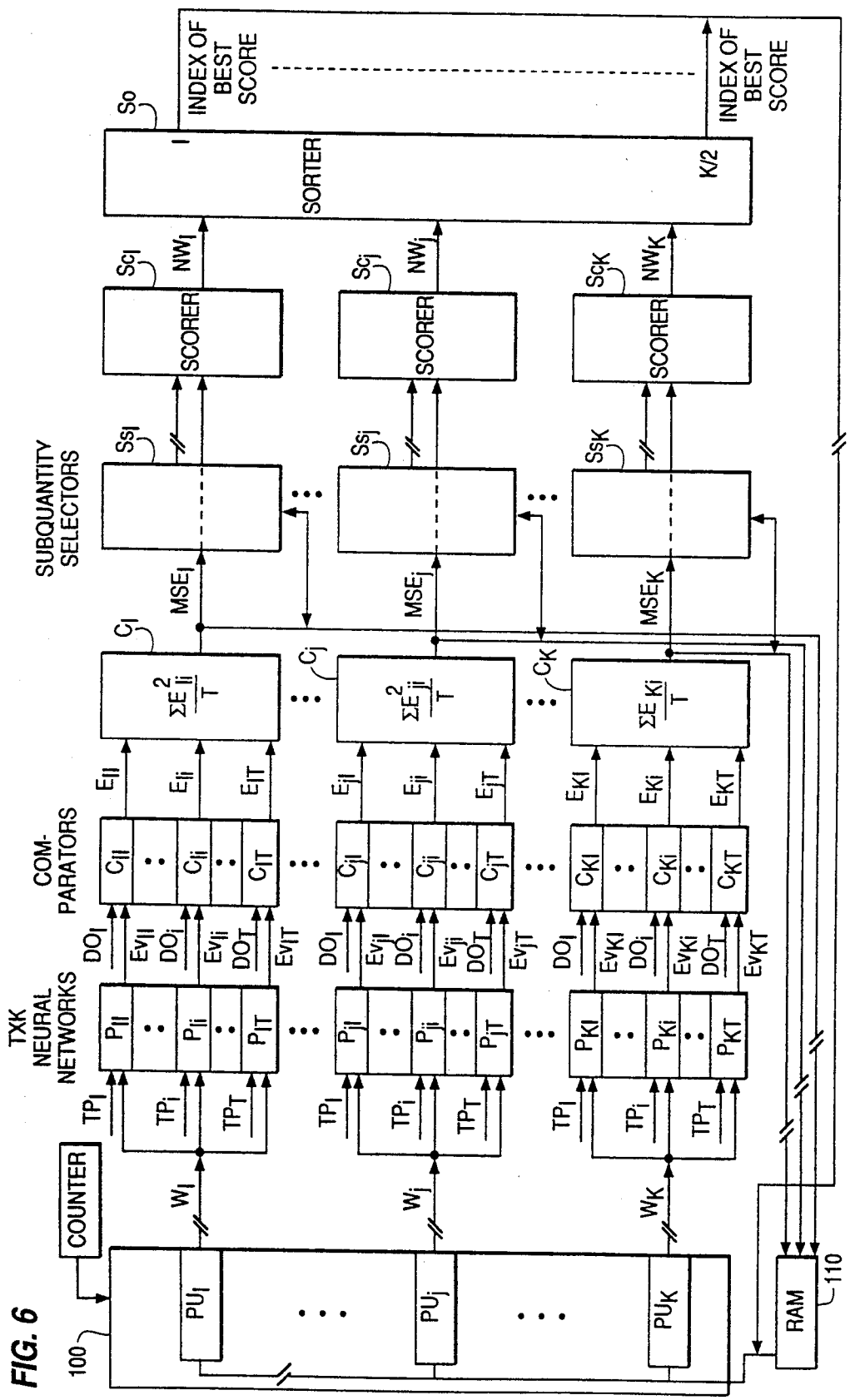
FIG. 6 is a block diagram of a circuit arrangement for training a neural network according to the process illustrated in FIGS. 4A and 4B using parallel processing.

Referring to FIG. 6, there is illustrated a block diagram of a circuit arrangement with which many of the steps of training a neural network illustrated in FIGS. 4A and 4B can be performed in parallel. Hardwiring is used to connect elements of the circuitry utilized so that maximum use can be made of parallel processing in order to maximize processing speed.

Figure 7:
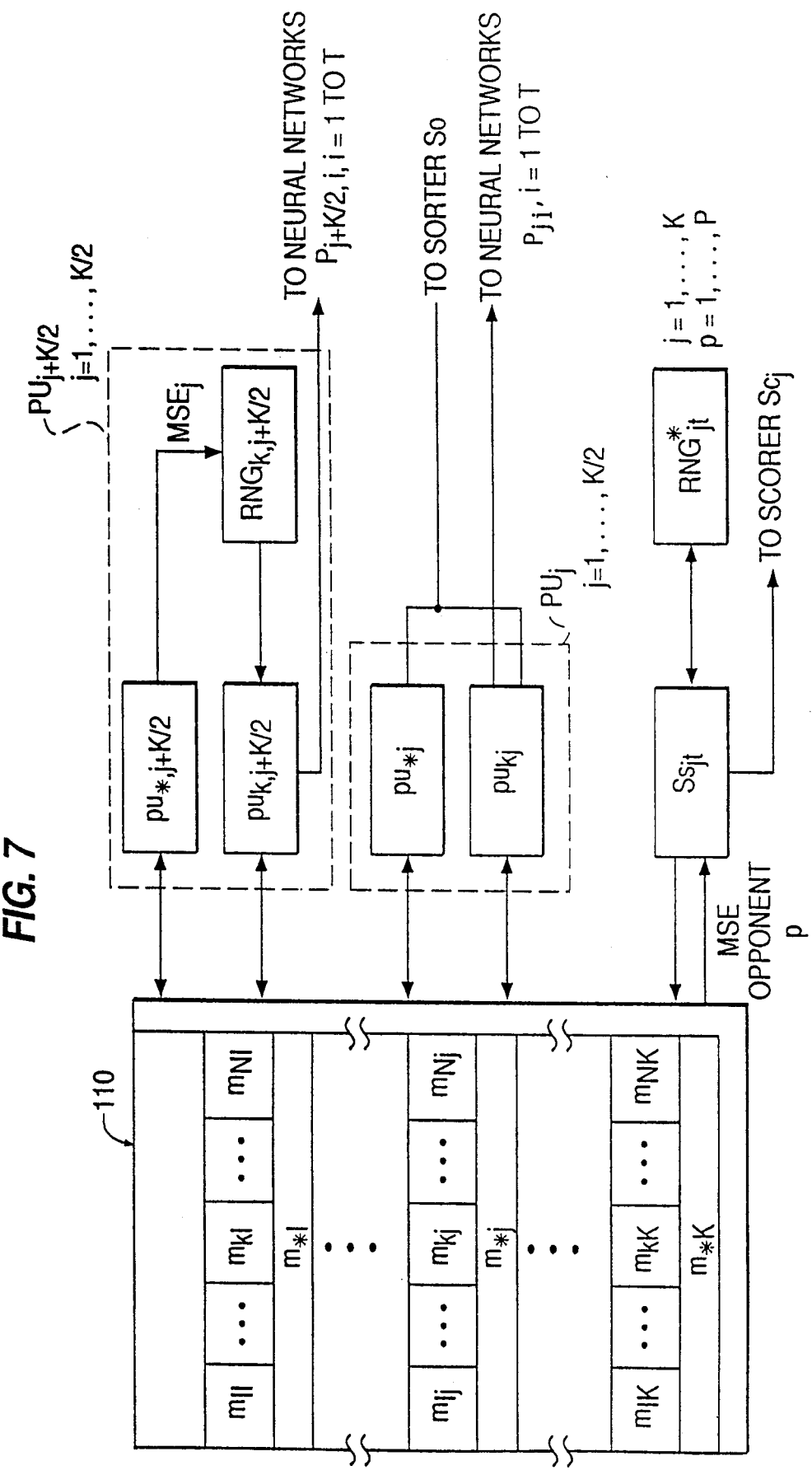
FIG. 7 is a block diagram of the memory, processor units and overall error value calculating circuits of the circuit arrangement of FIG. 6.

In the preferred embodiment, a processor 100 and a memory 110 are provided. As shown in FIG. 7, the memory 110 has storage locations $m*_j$ for storage of respective mean square error values $MSE_j$ $j=1, \ldots, K$, and storage locations $m_{kj}$ $j=1, \ldots, K$, $k=1, \ldots, N$ for the storage of respective weight values $w_{kj}$. The processor 100 has K processor units $PU_j$ $j=1, \ldots, K$, each of which has a subprocessor unit $pu*_j$, N subprocessor units $pu_{kj}$ and N random number generators $RNG_{kj}$. As illustrated in FIG. 7, the subprocessor units can independently access in parallel the corresponding storage locations $m*_j$ and $m_{kj}$. Each subprocessor unit $pu_{kj}$, $k=1, \ldots, N$, $j=K/2+1, \ldots, K$, is associated with a corresponding random number generator $RNG_{kj}$ whose function will be described below. Following the procedure defined by steps S1-S4 there are initially selected K ordered sets $W_j$, $j=1, \ldots, K$, of N weight values $w_{kj}$, $j=1, \ldots, K$, $k=1, \ldots, N$ which are initially input to and stored in the corresponding memory locations $m_{kj}$. Illustration of the manner of generating and inputting such initial sets of weight values to the memory elements is omitted for the sake of clarity. T training patterns $TP_i$, $i=1, \ldots, T$, of known identity, for example, pixels values in different photographs of different persons, including more than one photograph of a person to be identified, are provided for the purposes of training. $K \times T$ neural networks $p_{ji}$, $j=1, \ldots, K$, $i=1, \ldots, T$, the values of the connection and threshold weights can be independently changed in parallel and which are otherwise of identical architecture, are provided for the training. Consider, for example, the set $W_1$ of weight values $w_{lk}$, $k=1, \ldots, N$. This set of weight values is to be used by each of the T neural networks $p_{li}$, $i=1, \ldots, T$. In the repeated performance of step S4, each of these networks is to have applied to its input layer of nodes a corresponding one of the training patterns so that training pattern $TP_i$ is to be applied to network $p_{li}$ for, $i=1, \ldots, T$. Similarly, the set of weight values $W_2$ is used by the neural networks $p_{2i}, i=1, \ldots, T$, to which the corresponding training patterns $TP_i$ are applied and so on for the remaining sets of weight values $W_3, \ldots, W_K$ and neural networks $p_{3i}, \ldots, p_{Ki}, i=1, \ldots, T$.

The output layers of the respective neural network $p_{ji}$ output in parallel the corresponding evaluations $Ev_{ji}$ which for the sake of simplicity are assumed to be single values. The evaluations $Ev_{ji}$ are compared in parallel with the desired output values $DO_i$ in corresponding comparators $C_{ji}, i=1, \ldots, T, j=1, \ldots, K$. For each j, $j=1, \ldots, K$, the T comparison results $E_{ji}, i=1, \ldots, T$, produced in parallel by the T neural networks $p_{ji}, i=1, \ldots, T$, undergo in parallel in respective mean square error calculating circuits $C_j, j=1, \ldots, K$ a mean square error analysis to obtain respective mean square values $MSE_j, j=1, \ldots, K$. The values $MSE_j$ are measures of how well overall the neural networks $p_{ji}, i=1, \ldots, T$, with weight value sets $W_j$ did in distinguishing those training patterns having the particular identity from those which do not.

The mean square error values $MSE_j$ are output by circuits $C_j$ to the respective storage locations $m*_j$ in the memory 110 where they replace any mean square error value previously stored in such locations, and to a corresponding subquantity selector $Ss_j$ which selects a subquantity $\{MSE\}_j$ of all of the mean square error values with which it will be compared. Assume that P mean square error values (P a positive integer greater than 1) are to be selected. There each selector $Ss_j$ will include P processors $s_{jp}$ and P associated random number generators $RNG*_{jp}, p=1, \ldots, P$, wherein the random number generators $RNG*_{jp}$ produce random numbers from the uniform distribution over the range zero to one. The selections are performed by the processors $Ss_{jp}$ with the aid of random number generators $RNG*_{jp}$ according to the above described step 6. That is, each processor $s_{jp}$ receives a random number from the generator $RNG*_{jp}$, multiplies the number by K, truncates the result at the decimal point, and retrieves from the memory 110 the mean square error value stored at storage location whose index is equal to the truncated number. Each processor $s_{jp}$ then performs a competition, that is, compares one of the comparison values $\{MSE\}_j$ with the value $MSE_j$, in parallel and passes on the result to a corresponding scorer $Sc_j$. Each scorer $Sc_j$ adds up the results of the competitions performed in the selector $Ss_j$ thereby to determine the number $NW_j$ of wins, that is, the number of instances in which the individual value $MSE_j$ is less than a value of the subquantity $\{MSE\}_j$.

The numbers of wins or scores $NW_j, j=1, \ldots, K$, are input to a sorter So which according to step S7 described above, determines the highest K/2 scores and arrange and outputs in parallel on separate output lines numbered 1 to K/2 the indices of their corresponding weight values sets $W_j$ in decreasing order of the scores $NW_j$ corresponding thereto. Each of the lines 1 to K/2 is coupled to the subprocessor units $pu*_j$ and $pu_{kj}, k=1, \ldots, N$, of the processor 100 whose index j is equal to the line number.

Thus, the ordered indices on these lines are input in parallel to the respective subprocessor units $pu_{jk}$ and $pu*_k$. In response thereto, the subprocessing units $pu*_j$ and $pu_{kj}$ retrieve the mean square error values and weight values stored in the storage locations corresponding to the indices, that is, the storage locations for the weight value sets and mean square error values with the highest K/2 scores, and insert them in the locations $m*_j$ and $m_{kj}$ and in the locations $m*_{j+K/2}$ and $m_{kj+K/2}$, thereby reindexing and copying these weight value sets and mean square error values. The subprocessor units $pu_{k,j+K/2}$ now retrieve the copies of the best K/2 sets of weight values from locations $m_{kj+K/2}$ and mutates them in the following manner: The subprocessor units $pu*_{j+K/2}$ retrieve the mean square error value copies from from locations $m*_{j+K/2}$ and input them to each of the corresponding random number generators $RNG_{k,K/2+j}, k=1, \ldots, N$. Each of the random number generators $RNG_{k,K/2+j}, k=1, \ldots, N$, outputs a number from a Gaussian distribution of mean zero and variance which is a function of (e.g. equal to) the mean square error value $MSE_j$ at its input. The subprocessor units $pu_{k,j+K/2}$ add the weight values $w_{kj}$ and the respective outputs of the random number generators $RNG_{k,K/2+j}$ to obtain new weight values $w_{k,j+K/2}$ which are then stored in the respective storage locations $m_{k,j+K/2}$. In this way, all of the sets of weight values whose scores were among the K/2 lowest as determined by the sorter So, are in effect replaced by new sets of weight values which are mutations of the sets of weight values whose scores were among the K/2 highest as determined by the sorter So. The entire process is repeated again and again, each time replacing half of the sets of weight values a predetermined number of times or until the sets of weight values converge to a single final set with sufficiently low error, whereupon the entire training process is terminated.

Figure 8:
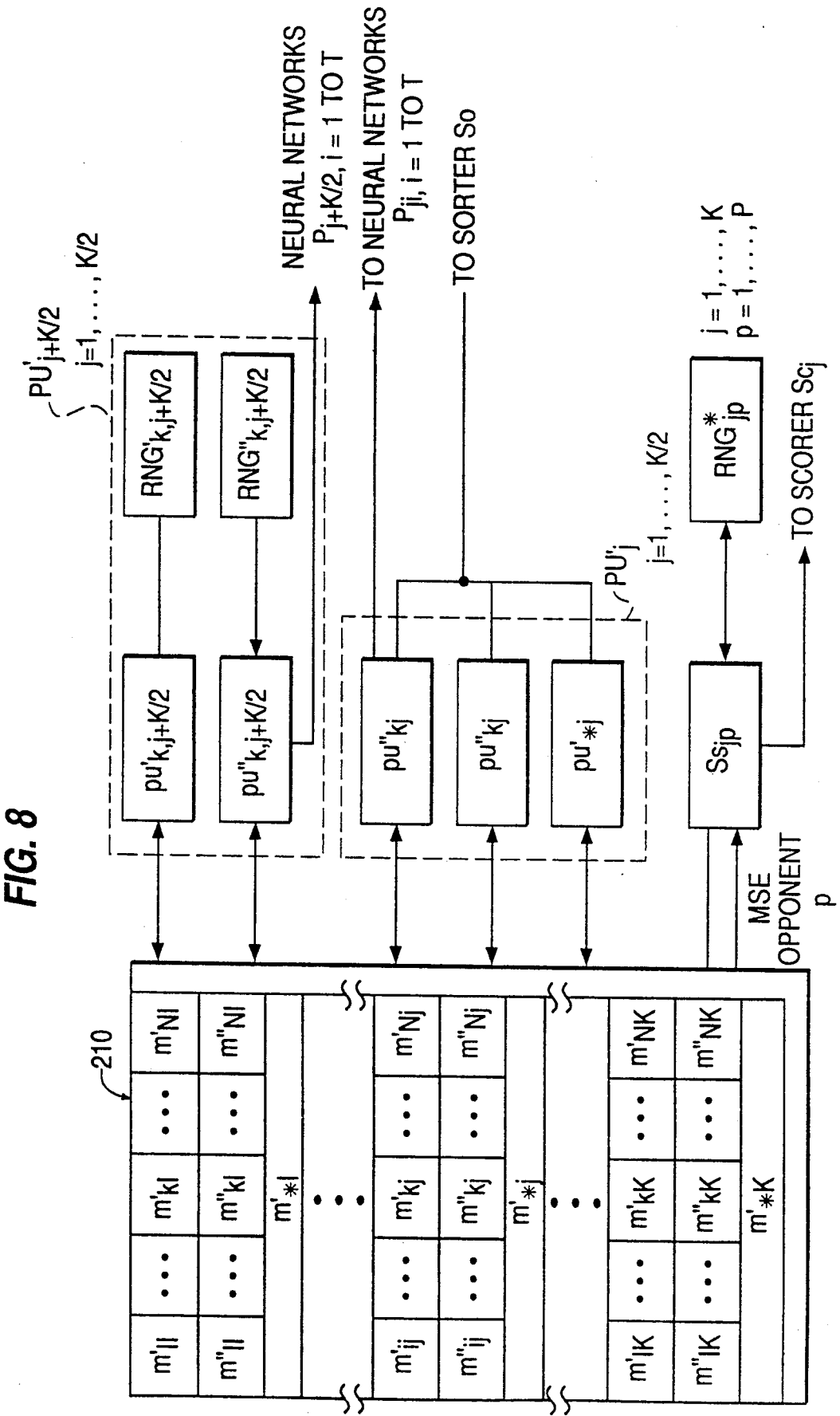
FIG. 8 illustrate modifications of the circuitry of FIG. 7 for training a neural network according to the process illustrated in FIGS. 5A and 5B using parallel processing.

In order to train a neural network according to the method illustrated in FIGS. 5A and 5B, it is only necessary modify the processor units $PU_j$ and expand the memory 100 as illustrated in in FIG. 8. The embodiment of FIG. 8 differs functionally from that of FIG. 7 only in the manner in which the variances are determined for the random number generators $RNG_{k,j+K/2}$. Therefore, only the differences between the structures and operations of the processor units and memories of the two embodiments which are necessary to perform the method steps illustrated in FIGS. 5A and 5B need be explained for an understanding of circuit arrangement of FIG. 8.

Referring to FIG. 8, each of K processor units $PU'_j$ $j=1, \ldots, K$, has N individual subprocessor units $pu'_{kj}$ and $pu''_{kj}, k=1, \ldots, N$, which permit weight values and variance values stored at corresponding storage locations $m'_{kj}$ and $m''_{kj}$ in the memory 210, to be modified, output and transferred between storage locations in parallel in a manner to be described below. The processor units $PU'_j, j=1, \ldots, K/2$, also have subprocessor units $pu'*_j$, each of which can access in parallel all of the memory locations $m'*_j$ used to store respective mean square error values $MSE_j$. Associated with each subprocessor unit $pu'_{k,j+K/2}, k=1, \ldots, N, j=1, \ldots, K/2$, is a random number generator $RN'_{kj}$ and associated with each subprocessor unit $pu''_{k,j+K/2}, k=1, \ldots, N$, $j=1, \ldots, K/2$, is a random number generator $RNG''_{kj}$, whose functions will be described below.

Illustration of the manner of generating and inputting initial weight values to the memory locations $m'_{kj}$ and of inputting initial variance values $v_{kj}$ to the memory locations $m''_{kj}$ are omitted for the sake of clarity. As with the circuit arrangement of FIGS. 6 and 7 in step S7, the circuit arrangement of FIGS. 6 and 8 in step S7' (1) determines the highest K/2 of the K scores (numbers of wins) $NW_j$, $j=1, \ldots, K$ output by the scorers $Sc_j$, and (2) sorts and outputs on separate lines numbered 1 to K/2 the indices of those highest scores in an order of decreasing numbers of wins. Each of the lines 1 to K/2 is coupled to the subprocessor units $pu'_{kj}$, $pu''_{kj}$, and $pu'_{*j}$ whose index j is equal to the line number. Thus, the ordered indices on these lines are input in parallel to the respective subprocessor units $pu'_{kj}$, $pu''_{kj}$, and $pu'_{*j}$ which in response thereto, in parallel, rearrange the locations in memory of the sets of weight values having the highest K/2 scores and the corresponding sets of variance values and mean square error values. The locations of the mean square error values and the sets of weight values and variance values are rearranged so that for each value of j, $j=1, \ldots, K/2$, the set of weight values having the jth highest score and the corresponding set of variance values and mean square error value are stored in the row of memory locations $m'_{kj}$, $k=1, \ldots, N$, the row of memory locations $m''_{kj}$, $k=1, \ldots, N$, and the storage location $m'_{*j}$ respectively, thereby reindexing these sets of weight values, variance values and mean square error values. Then, after the running count parameter is increased by K/2 in step S8' and the running count is determined to be less than the maximum count Mx in step S9', the subprocessor units $pu'_{kj}$ and $pu''_{kj}$, in parallel, repeat step S4' by respectively copying the newly reindexed weight values $w_{kj}$ $k=1, \ldots, N$, $j=1, \ldots, K/2$, to the storage locations $m'_{k,j+K/2}$ and copying the newly reindexed variance values $v_{kj}$ to the storage locations $m''_{k,j+K/2}$. The subprocessor units $pu'_{k,j+K/2}$ and $pu''_{k,j+K/2}$ then retrieve these copied values from the storage locations $m'_{k,j+K/2}$ and $m''_{k,j+K/2}$ and apply them to the random number generators $RNG'_{k,j+K/2}$ and $RNG''_{k,j+K/2}$. Each of the random number generators $RNG'_{k,j+K/2}$ is controlled to output a number from a Gaussian distribution of zero mean and variance equal to the variance value $v_{kj}$ at its input. The subprocessor units $pu'_{k,j+K/2}$ add the weight values $w_{kj}$ and the respective numerical outputs of the random number generators $RNG'_{k,j+K/2}$ to obtain new weight values $w_{k,j+K/2}$ which are stored in the respective storage locations $m'_{k,j+K/2}$. In this way, all of the sets of weight values whose scores were among the K/2 lowest as determined by the sorter So, are in effect replaced by new sets of weight values which are mutations of the sets of weight values whose scores were among the K/2 highest.

Each of the random number generators $RNG''_{k,j+K/2}$ is controlled to output a number from a Gaussian distribution having a zero mean and a variance which is proportional, by the inverse of the above described factor VarScale, to the variance value $v_{kj}$ at its input. Each subprocessor unit $pu''_{k,j+K/2}$ adds the variance value $v_{kj}$ and the output of the random number generator $RNG''_{k,j+K/2}$. If the sum is greater than zero, the sum is applied to and stored in the storage location $m''_{k,j+K/2}$. If the sum is less than zero, the above described minimum variance value $\epsilon$ is applied to and stored in the storage location $m''_{k,j+K/2}$ as the new variance $v_{k,j+K/2}$. In this way, all of the sets of variances which correspond to weight values whose scores were among the K/2 lowest, are in effect replaced by new sets of variance values which are mutations of the sets of variance values whose scores were among the K/2 highest. The entire process is repeated again and again, each time replacing half of the sets of weight values a predetermined number of times or until the sets of weight values converge to a single final set with sufficiently low error, whereupon the entire training process is terminated.

It will be understood that the above description of the present invention is susceptible to various modifications, changes and adaptations, and the same are intended to be comprehended within the meaning and range of equivalents of the appended claims.

What is claimed is:

1. A method of training a neural network to evaluate data, comprising the steps of:
    (a) configuring a neural network having a plurality of interconnected nodes including an input layer and an output layer, said neutral network being capable of receiving training patterns at said input layer and operative in a plurality of different weighted configurations, each defined by a different set of weight values;
    (b) selecting a set of weight values and adjusting the network to operate in a weighted configuration defined by said set of weight values, and inputting each of a plurality of training patterns to said input layer to generate respective evaluations of the training patterns as outputs of the network at said output layer;
    (c) comparing each evaluation of a respective training pattern to a desired output of the network to obtain a corresponding error;
    (d) determining from all of the errors obtained in said step (c) an overall error value corresponding to the set of weight values;
    (e) repeating said steps (b), (c) and (d) a plurality of times, each time with a different weighted configuration defined by a respective different set of weight values, to obtain a plurality of overall error values;
    (f) for each of said sets of weight values, determining a score by selecting respective error comparison values from a predetermined variable probability distribution and comparing thereto the corresponding overall error value;
    (g) selecting a predetermined number of the sets of weight values determined to have the best scores;
    (h) generating copies of the sets of weight values selected in said step (g);
    (i) for each of the copies, perturbing the weight values thereof generated in said step (h) by adding random numbers to the weight values to create a new set of weight values, the random numbers being obtained randomly from a continuous random distribution of number having a mean of zero and a variance which is a function of the overall error value determined for the set of weight values from which the copy was generated;
    (j) incrementing a counter each time said steps (b) through (i) are performed, wherein said steps (b) through (e) are performed with at least the weighted configurations defined by the new sets of weight values created in the immediately preceding said step (i), and said steps (f) through (i) are performed with the sets of eight values selected in the immediately preceding said step (g) and with the new sets of weight values created in the immediately preceding said step (i) until the counter reaches a maximum count value;
    (k) selecting, once the counter reaches the maximum count value, the set of weight values having a final best score as determined in step (g); and (l) configuring the neural network to have the plurality of nodes interconnected in accordance with the set of weight values having the final best score.

2. A method of training a neural network according to claim 1, wherein said step (f) includes the steps of randomly selecting a subquantity of the plurality of overall error values determined in said steps (b), (c), (d), and (e), comparing each of the plurality of overall error values to each overall error value of the randomly selected subquantity, and scoring each set of weight values according to the comparisons of the corresponding overall error values with the overall error values of the subquantity.

3. A method of training a neural network according to claim 2, wherein all of the comparisons performed in said step of comparing are performed in parallel and all of the scoring performed in said step of scoring are performed in parallel.

4. A method of training a neural network according to claim 1, wherein said step (d) comprises determining a mean square error value corresponding to the set of weight values as the overall error value.

5. A method of training a neural network according to claim 4, wherein said step (i) includes perturbing the weight values by adding random numbers thereto obtained from a Gaussian distribution whose variance is proportional to the mean square error value.

6. A method for training a neural network according to claim 1, wherein said step (i) includes, for each copy generated in said step (h), the step of generating a random distribution of numbers having a mean of zero and a variance which is proportional to the overall error value corresponding to said each copy, and adding to each weight value of said copy a number randomly selected from said random distribution to create said new sets of weight values.

7. A method of training a neural network according to claim 6, wherein said step of generating a random distribution of numbers comprises generating a Gaussian distribution of numbers whose variance is proportional to the overall error value.

8. A method of training a neural network according to claim 1, wherein said step (g) includes selecting a number of sets of weight values equal to one plus one half of the number of times that steps (b), (c) and (d) are repeated according to step (e).

9. A method of training a neural network according to claim 1, wherein said neural network comprises a plurality of neural networks equal in number to the number of training patterns, each neural network being capable of receiving training patterns and operative in a plurality of different weighted configurations, and wherein in said step (b), the training patterns are input to respective ones of said neural networks in parallel and evaluated in parallel to generate the evaluations of the respective training patterns in parallel, and in said step (c), the evaluations are compared to respective desired outputs in parallel to obtain corresponding errors in parallel.

10. A method of training a neural network according to claim 9, wherein in said step (b), for each network, the weighted configuration is adjusted by adjusting all of the weight values thereof in parallel.

11. A method of training a neural network according to claim 9, wherein the repetitions of said steps (b), (c) and (d) a plurality of times, each time with a different weighted configuration, in said step (e) are performed in parallel.

12. A method of training a neural network according to claim 11, wherein the scoring of said sets in said step (f) are performed in parallel 13. A method of training a neural network according to claim 12, wherein the sets are copied in parallel in said step (h).

14. A method of training a neural network according to claim 13, wherein the copies are mutated in parallel in said step (i).

15. A method of training a neural network according to claim 14, wherein the weight values of each set are copied in parallel in said step (h).

16. A method of training a neural network according to claim 15, wherein the weight values of each copy are mutated in parallel in said step (i).

17. A method of training a neural network according to claim 1, wherein the repetitions of said steps (b), (c) and (d) a plurality of times, each time with a different weighted configuration, in step (e) are performed in parallel.

18. A method of training a neural network according to claim 1, wherein the scoring of said sets in said step (f) is performed in parallel.

19. A method of training a neural network, comprising the steps of:
(a) configuring a neural network having a plurality of interconnected nodes including an input layer and an output layer, said neural network being capable of receiving data and operative in a plurality of different weighted configurations, each defined by a different set of weight values;
(b) adjusting the network to operate in a weighted configuration defined by a set of weight values, and inputting each of a plurality of training patterns to the network to generate evaluations of the respective training patterns;
(c) comparing each evaluation to a respective training pattern to a desired output to obtain a corresponding error;
(d) determining from all of the errors obtained in said step (c) an overall error value corresponding to the set of weight values;
(e) repeating said steps (b), (c) and (d) a plurality of times, each time with a different weighted configuration defined by a respective different set of weight values, to obtain a plurality of overall error values;
(f) for each of said sets of weight values, determining a score by selecting respective error comparison values from a predetermined variable probability distribution and comparing thereto the corresponding overall error value;
(g) selecting a predetermined number of the sets of weight values determined to have the best scores;
(h) generating copies of the sets of weight values selected in said step (g);
(i) for each of the copies, (1) generating random numbers from respective continuous random number distributions having a means of zero and having finite variances and (2) mutating the weight values of the copies by adding the random numbers to the weight values, thereby creating new sets of weight values forming progeny of the sets of weight values selected in said step (g);
(j) incrementing a counter each time said steps (b) through (i) are performed until the counter reaches a maximum count value, wherein said steps (b) through (e) are performed with at least the weighted configurations defined by the new sets of weight values created in the immediately preceding said step (i), and said steps (f) through (i) are performed with the sets of weight values selected in the immediately preceding said step (g) and with the new sets of weight values created in the immediately preceding said step (i), each said repetition of said step (i1) including the step of selecting by a stochastic process which is independent of the weight values obtained in any preceding performance of said step (i), the variances of the continuous random number distributions from which the random numbers added to weight values of the sets of weight values to create said progeny in said step (i2) are selected;

(k) selecting, once the counter reaches the maximum count value, the set of weight values having a final best score as determined in step (g); and (l) configuring the neural network to have the plurality of nodes interconnected in accordance with the set of weight values having the final best score.

20. A method of training a neural network according to claim 19, wherein said step (f) includes the steps of randomly selecting a subquantity of the plurality of overall error values determined in said steps (b), (c), (d), and (e), comparing each of the plurality of overall error values to each of the overall error values in said subquantity, scoring each set of weight values according to the comparisons of the corresponding overall error values with the overall error values of the subquantity, and selecting the sets of weight values having the best scores.

21. A method of training a neural network according to claim 19, wherein said step (d) comprises determining a mean square error value corresponding to the set of weight values as the overall error value.

22. A method of training a neural network according to claim 19, wherein for any new set of weight values created in said immediately preceding said step (i), which is a progeny of a set of weight values created in a still earlier repetition of said step (i), the step of selecting the variance in said step (i1) includes the steps of:

(i1a) selecting a number from a random distribution of zero mean and a variance which is a function of the variance of the continuous random number distribution from which the random numbers added to weight values of a set of weight values to create said progeny in said still earlier repetition of said step (i) were selected; and (i1b) adding together
 (A) said variance of the continuous random number distribution from which the random numbers added to weight values of a set of weight values to create said progeny in said still earlier repetition of said step (i) were selected and
 (B) the number selected in said step (i1a) to obtain the selected variance.

23. A method of training a neural network according to claim 22, wherein said step (i1a) includes the step of selecting the number from a Gaussian distribution of zero mean and a variance which is a proportional to the variance of the continuous random number distribution from which the random numbers added to weight values of a set of weight values to create said progeny in said still earlier repetition of said step (i) were selected.

24. A method of training a neural network according to claim 19, wherein the predetermined number of the sets of weight values selected in said step (g) is equal to one plus half of the number of times that steps (b)-(d) are repeated according to step (e).

25. A method of training a neural network according to claim 19, wherein said neural network comprises a plurality of neural networks equal in number to the number of training patterns, each neural network being capable of receiving training patterns and operative in a plurality of different weighted configurations, and wherein in said step (b), the training patterns are input to respective ones of said neural networks in parallel and evaluated in parallel to generate the evaluations of the respective training patterns in parallel, and in said step (c), the evaluations are compared to respective desired outputs in parallel to obtain corresponding errors in parallel.

26. A method of training a neural network according to claim 25, wherein the repetitions of said steps (b), (c) and (d) a plurality of times, each time with a different weighted configuration, in step (e) are performed in parallel.

27. A method of training a neural network according to claim 26, wherein the scoring of said sets in said step (f) are performed in parallel.

28. A method of training a neural network according to claim 27, wherein the sets are copied in parallel in said step (h).

29. A method of training a neural network according to claim 28, wherein the copies are mutated in parallel in said step (i).

30. A method of training a neural network according to claim 28, wherein the weight values of each set are copied in parallel in said step (h).

31. A method of training a neural network according to claim 30, wherein the weight values of each copy are mutated in parallel in said step (i).

32. A method of training a neural network according to claim 25, wherein in said step (b), for each network, the weighted configuration is adjusted by adjusting all of the weight values thereof in parallel.

33. A method of training a neural network according to claim 19, wherein the repetitions of said steps (b), (c) and (d) a plurality of times, each time with a different weighted configuration, in step (e) are performed in parallel.

34. A method of training a neural network according to claim 19, wherein the scoring of said sets in said step (f) are performed in parallel.

35. A method of training a neural network according to claim 19, wherein all of the comparisons performed in said step of comparing are performed in parallel and all of the scoring performed in said step of scoring is performed in parallel.

36. A neural network training apparatus, comprising:
(a) a plurality of neural networks each capable of receiving data and operative in a plurality of different weighted configurations, each configuration defined by a different set of weight values;
(b) means for adjusting each network to operate in different weighted configurations defined by a corresponding different set of weight values;
(c) means, responsive to an application of a plurality of training patterns to each of the networks, for generating respective evaluations of the training patterns from each of the networks as outputs of the networks;
(d) means for comparing the evaluations of the training patterns to corresponding desired outputs of the networks to obtain corresponding errors;

(e) means for determining from all of the errors obtained from said comparing means overall error values corresponding to the sets of weight values;

(f) for each of said sets of weight values, means for determining a score by selecting respective error comparison values from a predetermined variable probability distribution and comparing thereto the corresponding overall error value;

(g) means for selecting a predetermined number of the sets of weight values determined to have the best scores;

(h) means for generating copies of the sets of weight values selected by said selecting means;

(i) means for generating, for each weight value of the copies generated by said means for generating copies, a corresponding random number from a continuous random distribution of numbers having a mean of zero and a variance which is a function of the overall error value determined by said overall error generating means for the set of weight values from which the copy which includes said each weight value was generated; and (j) means for mutating the weight values of the copies by adding the corresponding random numbers thereto to create new sets of weight values, said means for adjusting including means for replacing some of the weighted configurations of said network with new weighted configurations based on said new sets of weight values.

37. An apparatus for training a neural network by adjusting weight values repetitive application of training patterns, comprising:

(a) a plurality of neural networks each capable of receiving data and operative in a plurality of different weighted configurations, each configuration defined by a different set of weight values;

(b) means for adjusting each network to operate in different weighted configurations defined by a corresponding different set of weight values;

(c) first generating means, responsive to an application of a plurality of training patterns to each of the networks, for generating respective evaluations of the training patterns from each of the networks as outputs of the networks;

(d) means for comparing the evaluations of the training patterns to corresponding desired outputs of the networks to obtain corresponding errors;

(e) means for determining from all of the errors obtained from said comparing means overall error values corresponding to the sets of weight values;

(f) for each of said sets of weight values, means for determining a score by selecting respective error comparison values from a predetermined variable probability distribution and comparing thereto the corresponding overall error value;

(g) means for selecting a predetermined number of the sets of weight values determined to have the best scores;

(h) second generating means for generating copies of the sets of weight values selected by said selecting means;

(i) third generating means for generating, by a stochastic process which is independent of weight values defining weighted configurations of the neural network, a corresponding variance value for each weight value of each copy generated by said means for generating copies;

(j) fourth generating means for generating, for each weight value of each copy generated by said means for generating copies, a corresponding random number from a continuous random distribution of numbers having a mean of zero and a variance generated by said third generating means; and (k) means for mutating the weight values of the copies by adding the corresponding random numbers thereto to create new sets of weight values, said means for adjusting including means for replacing the weighted configurations of some of said networks with new weighted configurations based on said new sets of weight values.

* * * * *